United States Patent [19]

Kato

[11] Patent Number: 5,488,529
[45] Date of Patent: Jan. 30, 1996

[54] METHOD FOR PREVENTING DEPOSITION ON MAGNETIC HEAD, AND PHOTOGRAPHIC FILM

[75] Inventor: Yoshiaki Kato, Minamiashigara, Japan

[73] Assignee: Fuji Photo Film Co., Ltd., Kanagawa, Japan

[21] Appl. No.: 16,906

[22] Filed: Feb. 12, 1993

[30] Foreign Application Priority Data

Feb. 14, 1992 [JP] Japan .................................. 4-59157

[51] Int. Cl.$^6$ .............................. G11B 5/41; G11B 15/60
[52] U.S. Cl. ................................... 360/128; 360/130.31
[58] Field of Search ................................ 354/105, 106, 354/75, 76; 353/12; 360/128, 103.31, 130.32, 130.1, 130.2, 130.21

[56] References Cited

U.S. PATENT DOCUMENTS

| 3,078,759 | 2/1963 | Brunswick | DIG./15 |
| 5,136,317 | 8/1992 | Goto et al. | 354/21 |

FOREIGN PATENT DOCUMENTS

| 55-113168 | 9/1980 | Japan | 360/130.32 |
| 58-70453 | 4/1983 | Japan | 360/130.31 |
| 61-192017 | 8/1986 | Japan | 360/128 |
| 61-192016 | 8/1986 | Japan | 360/128 |
| 62-212955 | of 1987 | Japan | 360/128 |
| 4157609 | 5/1992 | Japan | 360/128 |
| 5-2722 | 1/1993 | Japan | 360/128 |
| 90004214 | 4/1990 | WIPO. | |
| 9004253 | 4/1990 | WIPO. | |

Primary Examiner—John H. Wolff
Assistant Examiner—Allen Cao
Attorney, Agent, or Firm—Sughrue, Mion, Zinn, Macpeak & Seas

[57] ABSTRACT

A photographic film for information recording 1 has a step difference 3 in the form of a projection on its surface adapted to be pressure contacted with a surface of a magnetic head 2 facing a recording medium. The film 1 also has a transparent magnetic layer. The photographic film may be run with its step difference 3 kept in pressure contact with the surface of the magnetic head 2 facing the recording medium to present film debris from being deposited and stacked on the surface of the magnetic head facing the recording medium to prevent the playback output from being deteriorated.

9 Claims, 4 Drawing Sheets

METHOD FOR PREVENTING DEPOSITION ON MAGNETIC HEAD, AND PHOTOGRAPHIC FILM

The method for preventing deposition on the magnetic head and the photographic film according to the present invention are particularly effective for a magnetic head adapted for magnetically recording and/or reproducing the information on or from a photographic film having a sensitized layer for optically recording a photographed image and a magnetic layer for magnetically recording photographic data at the time of photographing.

BACKGROUND

It has been internationally disclosed to record or reproduce the information such as the film information or the information concerning the photographed image on or from a photographic film having a transparent magnetic layer in International Publication Numbers WO 90/04214 and WO 90/04253.

SUMMARY OF THE DISCLOSURE

Problems Encountered in the Related Art

A photographic film having a transparent magnetic layer has a thickness of an order of 100 μm, which is considerably thicker than the thickness of a magnetic tape now in current use. Consequently, it has been found that a stable contact between a magnetic head and the above-mentioned photographic film cannot be maintained.

The present inventor has conducted eager research and development with a view to solving the above problem, and found that, when recording and/or reproducing the information by a magnetic head, it is necessary to run the photographic film in a state in which the film is thrust by a roller or the like into pressure contact with a magnetic gap region of the magnetic head.

Referring to FIG. 8, a preferred case of running the photographic film in the above-mentioned pressure contact state is explained (it should be noted that while some part of FIG. 8 may be common to the prior art, as a whole FIG. 8 is not prior art; in particular, the roller to thrust the recording media into pressure contact with a surface of the magnetic head is not disclosed in the prior art). The photographic film for information recording 11 has information recording regions (tracks) S1, S2, T1 and T2, and an information recording region 91, and is taken up on a film take-up shaft, not shown, with the aid of perforations 71. Thus the film 11 is reeled out from a patrone 61 so as to travel in a direction shown by an arrow A in FIG. 8.

The film 11 is thrust by a roller 41, rotated about its own axis by a shaft 41a, so that it is pressure contacted at an information recording region thereof with a recording medium facing surface of a magnetic head 21, and is caused to travel in this state for information recording and reproduction.

However, it has also been found that satisfactory recording and reproduction become increasingly difficult to achieve in this case by the following reasons.

The protective layer for protecting the transparent magnetic layer and part of the magnetic layer may be grazed off by micro-sized steps of an order of thousands Angstroms on the surface of the magnetic head which is pressure contacted with the photographic film. The debris produced in this manner tend to be deposited in the gap of the magnetic head and its neighborhood so as to be stacked in the gap or in its neighborhood as the film is run repeatedly in pressure contact with the magnetic head. This renders it difficult to realize satisfactory recording and/or reproduction.

OBJECT OF THE INVENTION

It is an object of the present invention to overcome the above problem which has not been grasped precisely heretofore and to provide a method for preventing the debris from being deposited on the magnetic head, and a photographic film adapted therefor.

INVENTIVE SOLUTION OF THE PROBLEM

According to the present invention, the above object may be accomplished by the following deposition preventing method and photographic film.

(i) A method for preventing deposition on a magnetic head comprising running a step difference provided on said magnetic track or an extention of said magnetic track over a width being at least equal to or greater than that of said magnetic track in pressure contact with a surface of said magnetic head facing a recording medium, (ii) A recording medium wherein at least one magnetic track is provided along the longitudinal direction of said recording medium in the form of a film, and wherein recording and/or reproduction of information is executed by running a magnetic head in pressure contact with said magnetic track characterized in that a step difference is provided on said magnetic track or an extention of said magnetic track over a width being at least equal to or greater than that of said magnetic track.

Preferably, the step difference of the photographic film is projected from a film surface, or is a recess or a hole receded from the film surface.

With the method of the present invention for preventing deposition on a magnetic head, since a step difference formed on a running body in the film running direction is run in pressure contact with the magnetic head surface facing the recording medium, it is possible to prevent the debris produced by grazing of the protective layer or the magnetic layer of the photographic film from being deposited and stacked in as magnetic gap of the magnetic head and its neighborhood as well as to remove the deposited debris.

Since the photographic film having the magnetic layer according to the present invention is provided with a step difference in a film region which is run in pressure contact with the magnetic head surface facing the recording medium, the film can be run in pressure contact with the magnetic head surface facing the recording medium with the step difference being kept in pressure contact with the magnetic head surface facing the recording medium. It becomes possible in this manner to prevent the film debris from being deposited and stacked in the gap of the magnetic head and its neighborhood as well as to remove the deposited film debris.

Consequently, with the method for preventing deposition on the magnetic head and the photographic film, according to the present invention, the photographic film having the magnetic layer may be run in pressure contact with the magnetic gap region of the magnetic head without the fear of deterioration of the playback output.

BRIEF DESCRIPTION OF THE DRAWINGS

FIGS. 2a and 2b are schematic side elevational views showing the manner of removing the deposition on the magnetic head in accordance with the method of the present invention, wherein FIG. 2a shows the deposition which is about to be removed and FIG. 2b shows the deposition which has just been removed.

FIGS. 3b and 3c are cross-sectional views taken along line b—b of FIG. 3a.

FIG. 8b is a cross-sectional view taken along line b—b of FIG. 8a.

DESCRIPTION OF PREFERRED EMBODIMENTS

Figure 1A:
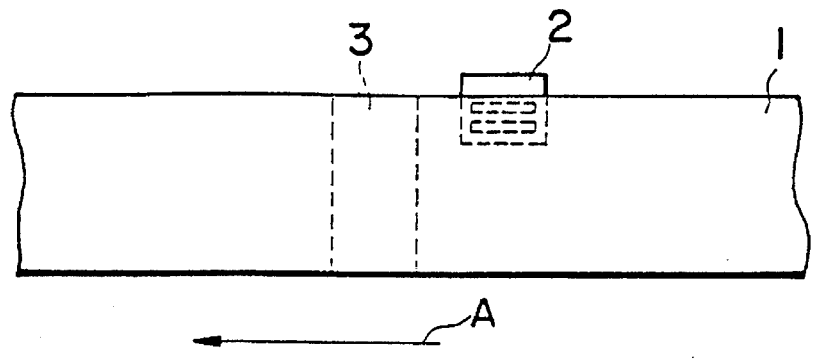
FIGS. 1a and 1b are a schematic plan view and a schematic side elevational view, respectively, showing the inventive method for preventing deposition on the magnetic, head by employing an illustrative photographic film of the present invention.

Method for Preventing Deposition on a Magnetic Head

The method for preventing the deposition according to the present invention consists in running a step difference provided in a running direction of a running body is pressure contact with a surface of a magnetic head facing a recording medium.

The running member has the step difference in the running direction.

It is sufficient if the running body may be run in pressure contact with the surface of the magnetic head which faces the recording medium and from which deposition is to be prevented. Usually, the running body is a recording medium having the step difference. However, the running provided with the step difference without being provided with the sensitized layer or the magnetic layer and which is used exclusively for removing the deposition.

The step difference may be projected from the surface of the running body or be receded from the surface of the running body, such as in the form of a through-hole or a bottomed hole.

Preferably, the step difference is not less than 90 μm in magnitude.

The frequency of the operation of running the step difference of the running body in pressure contact with the surface facing the recording medium depends on the thrusting load applied by the recording medium as it is run in its pressure-contact state, because the larger the thrusting load, the more is the amount of debris of the protective layer or the magnetic layer. With the thrusting load of an order of 80 g, the running operation needs to be performed at least once per the pressure contact running of the recording medium through 6 m and, preferably, at least once or twice per the pressure contact running of the recording medium through 1.2 m.

The thrusting load on the recording medium facing surface during pressure contact running of the step difference of the running body is preferably 50 g or more. The deposition preventing effect becomes outstanding for the thrusting load in excess of 50 g.

If the method of the present invention is to be applied to a magnetic head provided in a camera, the running body may be a photographic film provided with a magnetic layer. At least one step difference provided on the photographic film is sufficient.

If the method of the present invention should be applied to a variety of devices used in a large laboratory through the step of development and printing of a large number of films, the running body may be an elongated junction film composed of plural 12-, 24- or 36-frame photographic films joined to one another. Preferably, one or more step difference is provided per a film length of 6 m. The step difference may be provided in any film region pressure-contacted with the magnetic head.

Photographic Film Having Magnetic Layer

The photographic film of the present invention has a step difference at least in a film region brought into pressure contact with the recording medium facing surface of the magnetic head. The step difference may also be arranged outside the film region pressure-contacted with the recording medium facing surface of the magnetic head.

The step difference may be projected from the photographic film surface, or may be receded from the film surface, such as by partially removing the protective layer or the magnetic layer, or in the form of a through-hole or a bottomed hole.

The step difference is preferably of the order of 100 μm in magnitude.

The step difference may be formed as one with the photographic film, or may be provided as a projection which is secured to the film by means of an adhesive. The step difference in the form of the projection may be formed of synthetic resin, such as polyethylene terephthalate.

The step difference may be rectangular or circular in profile.

EMBODIMENT

Referring to the drawings, certain preferred embodiments of the present invention will be hereinafter explained.

FIRST EXAMPLE

Figure 1B:
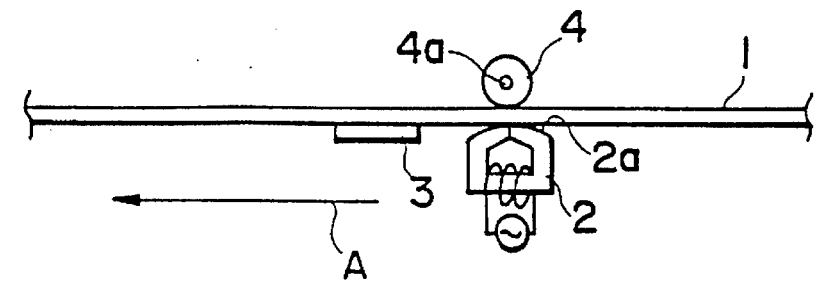

FIG. 1(a) is a plan view showing a method for preventing debris deposition on the magnetic head of the present invention by using an embodiment of a photographic film of the present invention, and FIG. 1(b) is a side view thereof.

A photographic film for information recording 1, shown in FIG. 1, having a transparent to substantially transparent magnetic layer, exhibiting light-transmitting properties, is about 1.2 m long, corresponding to 24 shots, and has a step difference 3, in the form of a protuberance, on the side thereof which is pressure-contacted with the recording medium facing surface of the magnetic head 2.

The step difference 3 is provided over a predetermined width in a direction along the width of the photographic film 1, that is in a direction transverse to the film running direction shown by an arrow A. The step difference 3 is formed of polyethylene terephthalate and secured to the photographic film 1 by means of an adhesive. The step 3 has a height of about 100 μm and a length equal to the film width Evaluation of Playback Output Using a magnetic head, magnetic recording was made on a photographic film of Example 1 at a recording density of approximately 500 bits per inch (BPI) to check for the relation between the number of times of film pass repetition and the playback output.

A photographic film 1, about 1.2 m long, was run from its leading end to its trailing end (one pass) by a roller 4 rotated about its own axis 4a, as it was thrust by roller 4 into pressure contact with a recording medium facing surface 2a of a magnetic head 2, under a thrusting load of 80 g, as shown in FIG. 1b. Meanwhile, the film 1 was taken up at its leading end, not shown, on a take-up shaft, also not shown, so as to be run in a direction shown by an arrow A. The take-up shaft is coupled to a rotating shaft of an electric motor, not shown, so as be rotated about its own axis. The film feed rate was on an order of 300 mm/s.

The results of the above evaluation have indicated that, with the use of the photographic film of Example 1, deterioration in the signal level of signals recorded on the film on reproduction was not more than 1 dB even after repetition of 1,000 film passes, thus demonstrating outstanding effects. (It is noted that the permissible range of the signal level deterioration is not more than about 2 dB).

COMPARATIVE EXAMPLE

Using a photographic film which is similar to the photographic film of Example 1 except not having the step difference 3, evaluation was carried out in the same manner as described above, as a Comparative Example. It was found that the playback output was deteriorated by about 3 dB by repetition of 500 film passes. It was also found that the deterioration in the playback output started at a time point corresponding to the end of the fifth pass.

Operation of Step Difference

Figure 2A:
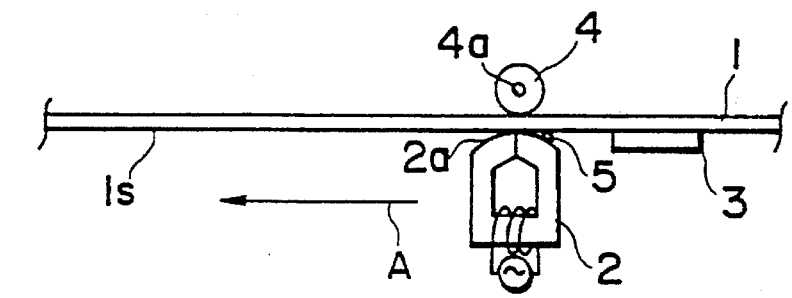
Figure 2B:
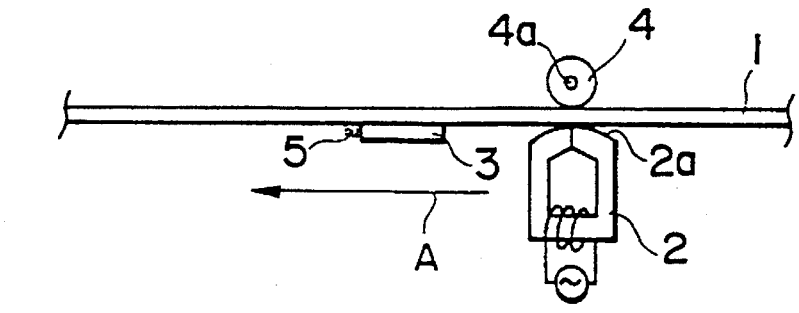

The reason the above effect is produced, that is the function of the step 3, is explained by referring to FIG. 2 in which the manner of removing the deposition on the film of the present invention in accordance with the method of the present invention is shown. FIGS. 2a and 2b show the state in which the deposition is about to be removed and the state in which it has just been removed, respectively.

The photographic film 1 has its one surface is coated sequentially with a transparent magnetic layer and a protective layer therefor. The film 1 is run in a direction shown by an arrow A by a roller 4 rotated about shaft 4a as it has its surface is thrust by the roller into pressure contact with the recording medium facing surface 2a of the magnetic head 2.

Micro-sized step differences of the order thousands of Angstroms unavoidably exist on the surface of the magnetic head facing recording medium for reasons related to manufacture. Consequently, should the film be run as it has its surface coated with the magnetic layer, that is its surface is kept in pressure contact with the recording medium facing surface of the magnetic head, the protective layer on the transparent magnetic layer of the film and part of the transparent magnetic layer are grazed off to produce debris which is affixed on a film entrance side of the facing surface of the recording medium to form a deposition 5.

The deposition 5 may be removed from the facing surface 2a of the magnetic head 2, by an end face of the step difference 3 of the film 1, as shown in FIG. 2b, if the step 3 is run in pressure contact with the facing surface 2a.

Consequently, the playback output may be prevented from being lowered in signal level.

EXAMPLES 2 to 6

Examples 2 to 6 of the photographic film of the present invention will be explained by referring to FIGS. 3 to 7, in which FIGS. 3a and 4 to 7 are plan views showing the Examples 2 to 6 of the photographic film of the present invention.

FIGS. 3 to 7 illustrate a photographic film for information recording 1 having a transparent to semi-transparent magnetic layer. The photographic film 1 has an image recording region 9 for optically recording an image and an information recording region or tracks $S_1$, $S_2$, $T_1$, $T_2$ for perforations 7 for guiding the travelling film and for wrapping the film on a rotating shaft, not shown, of the electric motor. The film 1 is contained within a cartridge 6.

The photographic films shown in FIGS. 3 to 7 are run in its longitudinal direction as it has its information recording region thrust into pressure contact with a recording medium facing surface of the magnetic head for magnetic recording or reproduction. This is particularly effective for a magnetic head provided in a camera making use of a film in its entirety.

EXAMPLE 2

Figure 3A:
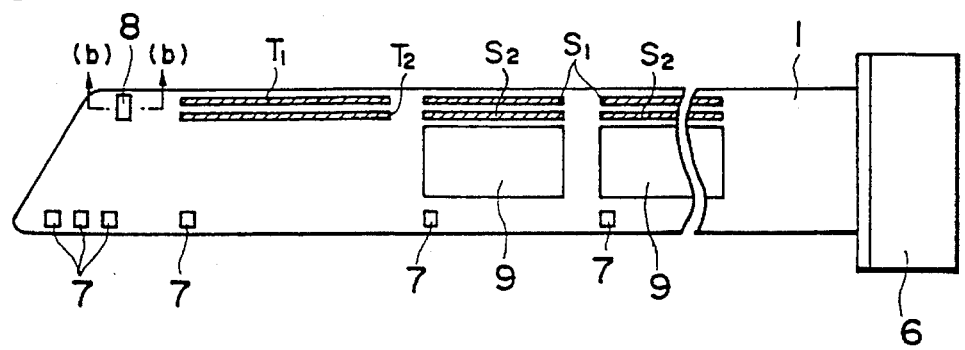
FIG. 3a is a plan view showing a photographic film according to the present invention.
Figure 3B:
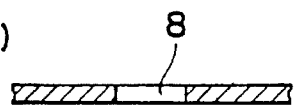
Figure 3C:
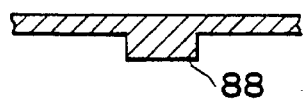

FIG. 3a shows a photographic film 1 having a recess 8 at a film end on a line of extension of the information recording region or tracks T1, T2 provided in the longitudinal direction of the film 1 at the longitudinal side of the film 1 free from perforations 7. FIG. 3b shows a cross-sectional shape of the recess 8. A projection 88 may be substituted for recess 8. FIG. 3C shows a cross-sectional shape of the projection 88.

EXAMPLE 3

Figure 4:
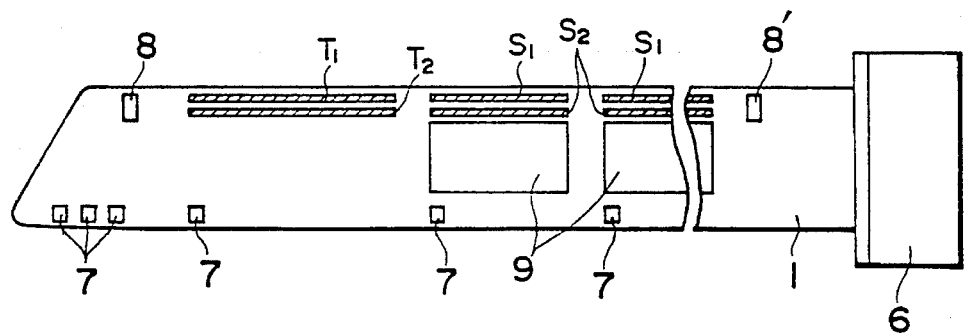
FIG. 4 is a plan view showing a photographic film according to another embodiment of the present invention.

FIG. 4 shows a photographic film in which another recess 8' is provided at the trailing end of the photographic film 1 of Example 2. The recess 8' is formed at the trailing end of the photographic film 1 on a line of extension along the film length of the information recording region (tracks) towards a longitudinal lateral side of the film 1 free from perforations 7.

EXAMPLE 4

Figure 5:
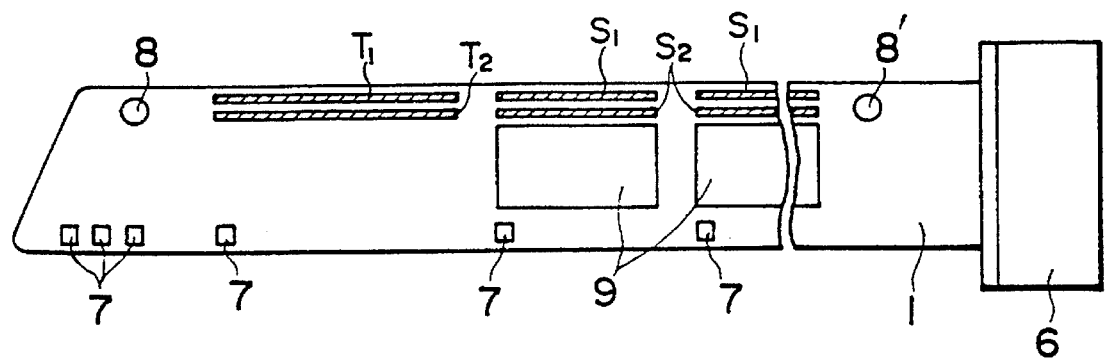
FIG. 5 is a plan view showing a photographic film according to a further embodiment of the present invention.

FIG. 5 shows a photographic film having circular recesses 8, 8' of the photographic film 1 of Example 3.

EXAMPLE 5

Figure 6:
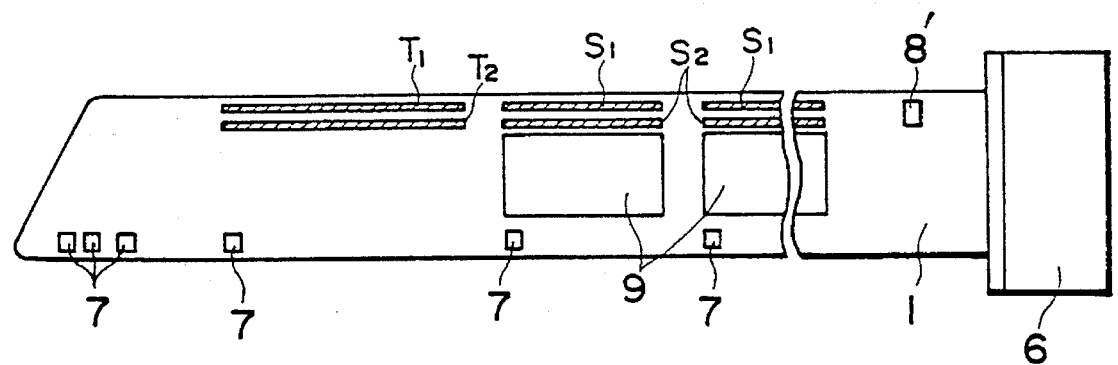
FIG. 6 is a plan view showing a photographic film according to a further embodiment of the present invention.

FIG. 6 shows a photographic film which is similar to the photographic film of Example 3 except that the recess 8 at the leading end of the film is omitted.

EXAMPLE 6

Figure 7:
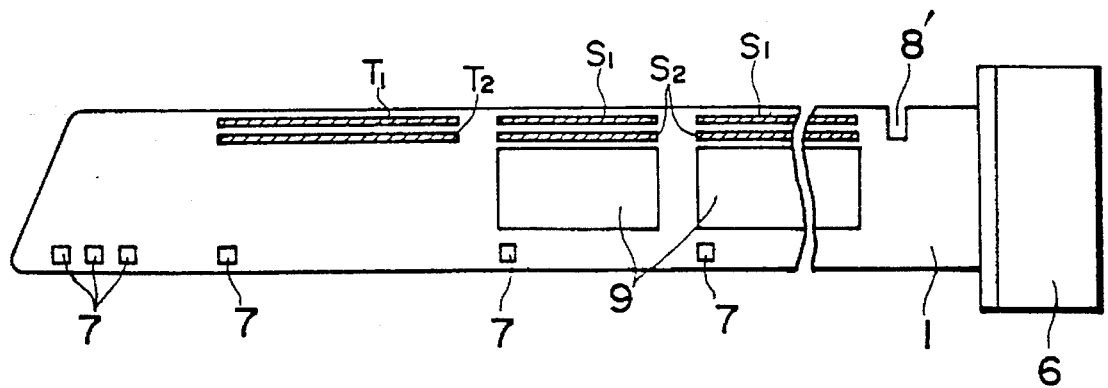
FIG. 7 is a plan view showing a photographic film according to a still further embodiment of the present invention.
Figure 8A:
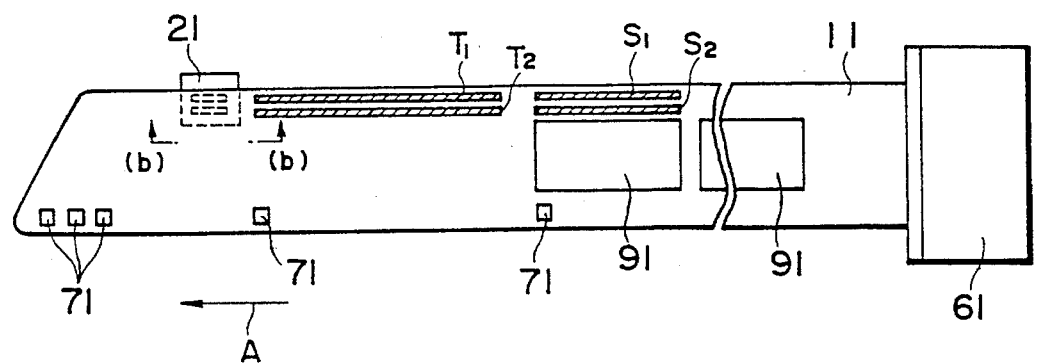
FIG. 8a is a plan view showing a photographic film having a transparent magnetic layer as the film is run in a pressure contact state, where a roller 41 shown in FIG. 8b is omitted.
Figure 8B:
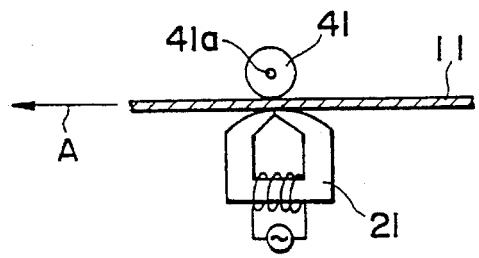

FIG. 7 shows a photographic film in which a notch 8' is provided in place of the recess 8' of the photographic film of Example 5.

Meanwhile, the recesses 8, 8' in the Examples 2 to 5 a step difference of an extremely small size of the order of 100 μm are sufficient. The recesses 8, 8' may be bottomed and need not necessarily be through-holes. The recesses 8, 8' may be replaced by projections having a step difference preferably of an order of 100 μm.

EXAMPLE 7

Similar effects may also be achieved with a photographic film having perforations in a film region adapted to run in pressure contact with the recording medium facing surface the magnetic head.

It should be noted that modification obvious in the art can be made without departing from the gist and scope as herein disclosed and claimed in the appended claims.

What is claimed is:

1. A method for preventing deposition on a magnetic head during information recording and/or reproducing on or from a photographic film wherein at least one magnetic track is provided along a longitudinal direction of said photographic film, and wherein information recording and/or reproduction is executed by running said magnetic track on a surface of the magnetic head, comprising running a step difference of a photographic film base provided on said magnetic track or an extension of said magnetic track over a width being at least equal to or greater than that of said magnetic track and disposed outside an image area of the photographic film in contact with said surface of the magnetic head.

2. A method as defined in claim 1, wherein the step of providing means for pressing comprises providing a roller at a position opposing to said magnetic head, with said film being interposed therebetween, to thrust said film into pressure contact with a surface of said magnetic head, and running said step difference in pressure contact with said magnetic head with the same travel speed as that for recording and/or reproduction.

3. A method as defined in claim 2 wherein a thrusting load on said film by said roller is 50 g to 150 g.

4. A method as defined in claim 2 wherein a thrusting load on said film by said roller is of an order of 80 g.

5. A method as defined in claim 2 or 3 wherein said travel speed is 20 mm/s to 200 mm/s.

6. A method as defined in claim 5 wherein a recording frequency is 1 kHz to 20 kHz.

7. A method as defined in claim 1 or 2 comprising running of said step difference in pressure contact with said magnetic head in a predetermined film running cycle.

8. A method as defined in claim 7 wherein said running of said step difference is performed once per a film running length of 1.2 m to 6 m.

9. A method as defined in claim 7 wherein said running of said step difference is performed at least once per a film running of one film roll.

* * * * *